(12) United States Patent
Wakeam et al.

(10) Patent No.: US 7,788,283 B2
(45) Date of Patent: Aug. 31, 2010

(54) ON DEMAND DATA PROXY

(75) Inventors: Jamie N. Wakeam, Seattle, WA (US);
Subha Bhattacharyay, Bellevue, WA (US); Gavin M. Gear, Bothell, WA (US); Timothy H. Kannapel, Bellevue, WA (US); Todd M. Landstad, Redmond, WA (US); Sebastian Poulose, Sammamish, WA (US); Zoltan C. Szilagyi, Redmond, WA (US); Jerome J. Turner, Redmond, WA (US); Haiyong Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1344 days.

(21) Appl. No.: 11/083,014

(22) Filed: Mar. 18, 2005

(65) Prior Publication Data

US 2006/0212802 A1    Sep. 21, 2006

(51) Int. Cl.
  *G06F 17/00* (2006.01)
(52) U.S. Cl. .................. 707/798; 707/797; 707/802; 707/810
(58) Field of Classification Search .................. None
  See application file for complete search history.

(56) References Cited

U.S. PATENT DOCUMENTS 7,292,726 B2 * 11/2007 Guha .................. 382/179
2004/0034642 A1 * 2/2004 Szilagyi et al. .............. 707/100

* cited by examiner

*Primary Examiner*—Baoquoc N To
(74) *Attorney, Agent, or Firm*—Woodcock Washburn LLP

(57) ABSTRACT

A system and process for enabling updates of an ink analysis document model are described.

34 Claims, 11 Drawing Sheets

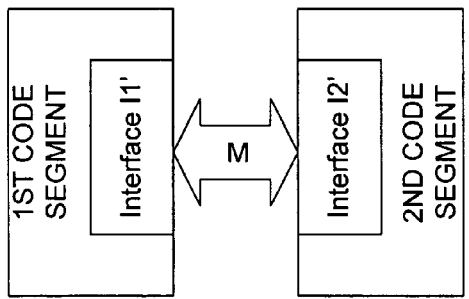
FIG. 1F
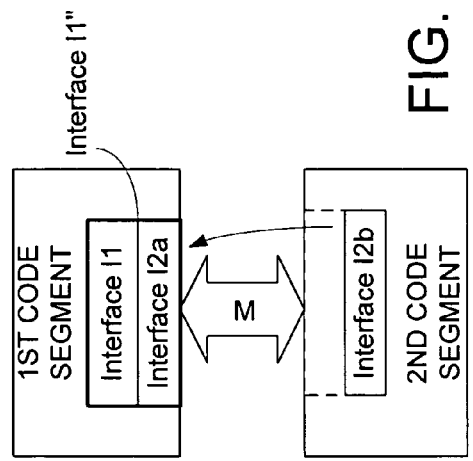
FIG. 1G
FIG. 1I
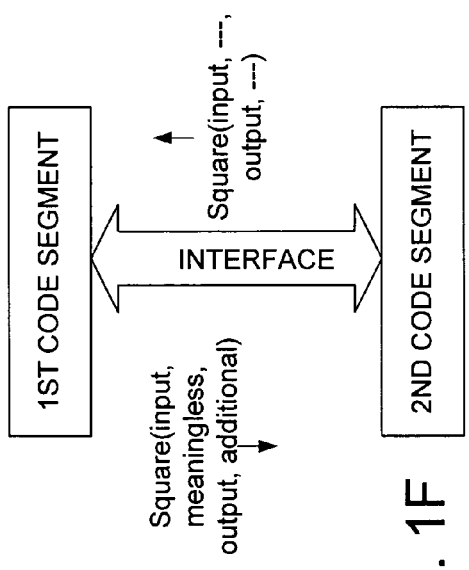
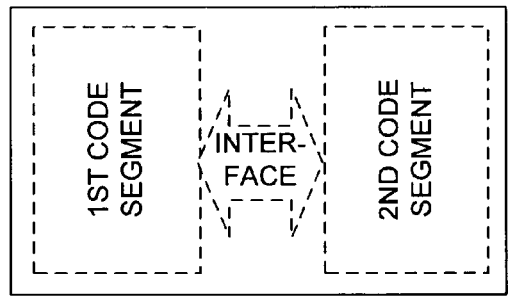
FIG. 1H

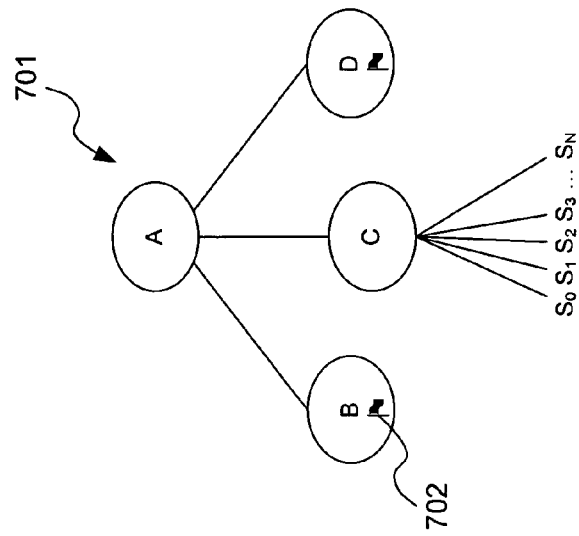

ON DEMAND DATA PROXY

BACKGROUND OF THE INVENTION

1. Field of the Invention

Aspects of the present invention relate to computing systems. More particularly, aspects of the present invention relate to synchronizing document models.

1. Description of Related Art

In addition to working with text input, computers now have the ability to record and modify electronic ink. Electronic ink may be kept in its native form or may be run through an analyzer to recognize text and annotations. Software applications are integrating the use and analysis of electronic ink into their functionality, enhancing the ability of users to create and edit documents.

These software applications have existing private data structures, used to store, process, and render data collected by the application. These private data structures typically do not match exactly the data format required by electronic ink analysis tools. Previous methods for handling disparate data structures have involved the software application implementing a particular programmatic interface callable by electronic ink analysis tools. In this manner, ink analysis tools could access the software application's private data structure directly and keep it updated. However, if a software application implemented the programmatic interface incorrectly, diagnosing the failure was cumbersome to near impossible.

As a result, two document models are maintained by a software application using electronic ink analysis tools, one for the private use of a software application, and one for ink analysis tools called by the application. Maintaining two document object models can be programmatically quite easy. Whenever a change is made to one model, update the other model. However, for lengthy documents, model updates can take a long time, slowing down the computer and frustrating the user.

Methods and systems for making the updating of ink analysis document models faster and more efficient are needed.

BRIEF SUMMARY OF THE INVENTION

Aspects of the present invention address one or more of the problems described above, thereby providing a way of enabling more efficient updates of an ink analysis document model.

BRIEF DESCRIPTION OF THE DRAWINGS

The present invention is illustrated, by way of example and not limitation, in the accompanying figures in which like reference numerals indicate similar elements and in which:

FIGS. 1B through 1M illustrate programming interfaces supporting one or more aspects of the present invention.

FIG. 5 depicts an illustrative example rendering of a private document model in accordance with aspects of the present invention.

FIG. 6 shows an illustrative private document model in accordance with aspects of the present invention.

FIGS. 7-9 show illustrative examples of incomplete context trees in accordance with aspects of the present invention.

DETAILED DESCRIPTION OF THE INVENTION

Figure 1A:
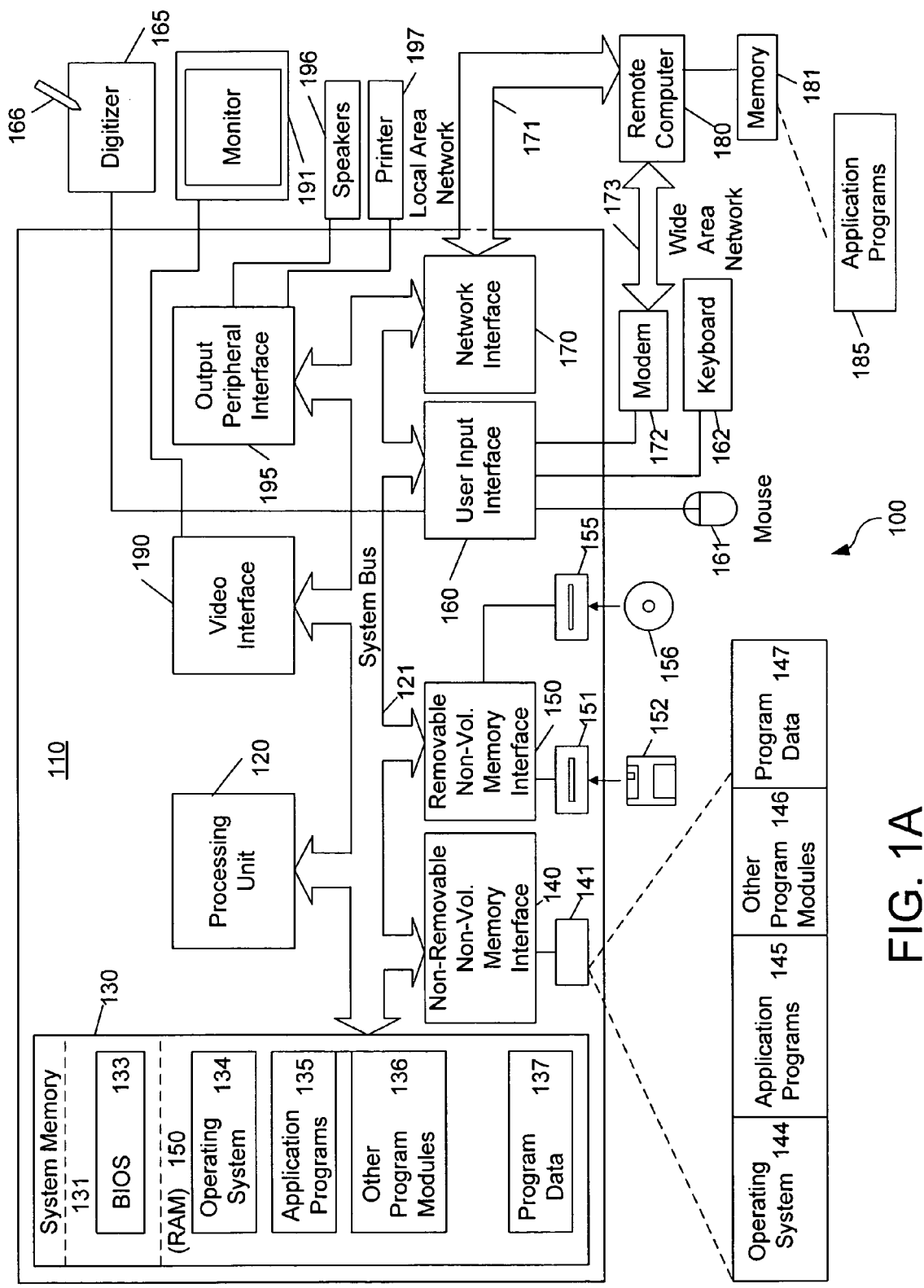
FIG. 1A illustrates a schematic diagram of a general-purpose digital computing environment in which certain aspects of the present invention may be implemented.

Aspects of the present invention relate to updating an ink analysis document object model. Aspects include allowing for partially populated document models, and requesting portions be populated on an as needed basis.

This document is divided into sections to assist the reader. These sections include: an overview, characteristics of ink, terms, general-purpose computing environment, synchronous document model updates, on demand document model updates, and a conclusion.

Overview

According to various embodiments of the invention, the recognition of a given set of electronic ink strokes may vary based on the context of the ink's placement within a document. Nearby strokes, textual words, images, and so forth, may provide context and guidance for the recognition process. For example, a note written in electronic ink with a line drawn to a nearby image may be recognized as merely a note and a line without the context of the image. Having the image in context may result in the ink being recognized as an annotation of the image.

To aid the recognition process, the contents of an ink analysis document object model (ink DOM) may be arranged into a tree structure populated with context nodes. Although tree structures are used throughout, other context node structures may be utilized, including graphs, arrays, tables, and so forth. The context nodes may include both electronic ink and textual representations of the ink. The tree may also include context nodes representing non-ink content, including but not limited to native text, text recognized from ink, text recognized from speech, drawings, pictures, charts, presentations, spreadsheets, mathematical equations, musical notations, audio and/or video clips, and other information.

Building a complete ink DOM allows an ink analysis engine to recognize strokes in their proper context. Software applications using ink analysis tools may build an ink DOM that can be shared with the analysis tools. This ink-specific document model may be duplicative of a private document model in use by the calling software application.

A private document model may be used by the calling software application as its own method of storing and manipulating a document. When requesting that ink within the document be analyzed, the software application may wish to allow further manipulation of the document. As such, the software application may create a duplicate set of data, in the form of an ink DOM, which can be used for analysis purposes. An ink analysis tool may then analyze the document copy while the calling software application continues to work with the private document model. When changes are made to the private document model, they may be replicated in the ink analysis document model. Alternatively, the ink DOM may only need updating when analysis is actually in use, and may only require that portions of the ink DOM be fully populated.

Aspects of the invention provide a method for utilizing an incomplete ink DOM, one which provides a high level set of context nodes, but which lacks a detailed accounting of all the elements in a document. Ink analysis tools may utilize this partially populated tree structure, requesting of the software application that certain nodes be fully populated when it is determined that these nodes will provide context for the recognition process. Prior to analysis, an ink analysis tool may request that the calling software application update portions of an ink DOM with the latest details. As analysis is performed, a series of events may be raised, informing the software application of impending changes to the ink DOM, changes which may need to be reflected in the application's private document model.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Among the characteristics described above, the temporal order of strokes and a stroke being a series of coordinates are primarily used. All these characteristics can be used as well.

Terms

| Term | Definition |
|---|---|
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |
| Ink object | A data structure storing ink with or without properties. |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Document | Any electronic file that has a viewable representation and content. A document may include a web page, a word processing document, a note page or pad, a spreadsheet, a visual presentation, a database record, a form, image files, and combinations thereof. |
| Document Object Model | Any structure for representing a collection of data which is meaningful to the software application using it. A document object model may include a tree of context node, a database table, an XML document, an array of objects in memory, and so forth. A document object model may be used to store the contents of a document, render a document to a display device, sort the contents of the document, etc. |
| Tree of Context Nodes | A data structure that describes the relationship between document elements that have already been analyzed and document elements that have yet to be analyzed. The data structure may optionally further include non-ink information (e.g., typed text, images, charts, and the like). This non-ink information may be used to aid in the recognition of the ink content. Further, the non-ink content may be annotated by the ink when an annotation engine is used. Because new content is availed to existing content, the existing content provides a context for the new information. |
| Render, Rendered, or Rendering | The process of determining how information (including text, graphics, and/or electronic ink) is to be displayed, whether on a screen, printed, or output in some other manner. |
| Computer-readable medium | Any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media." |

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1B:
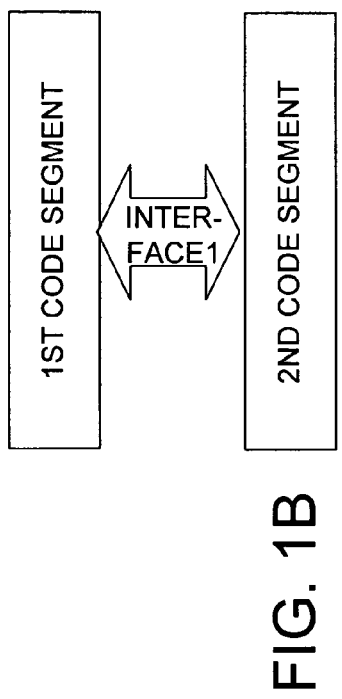
Figure 1C:
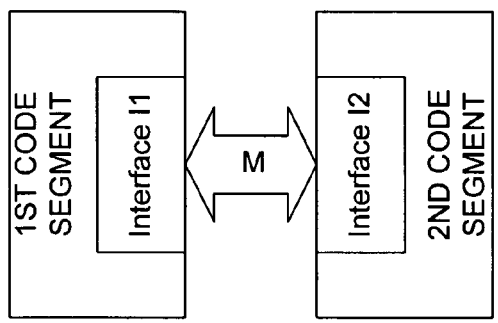

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification.

Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
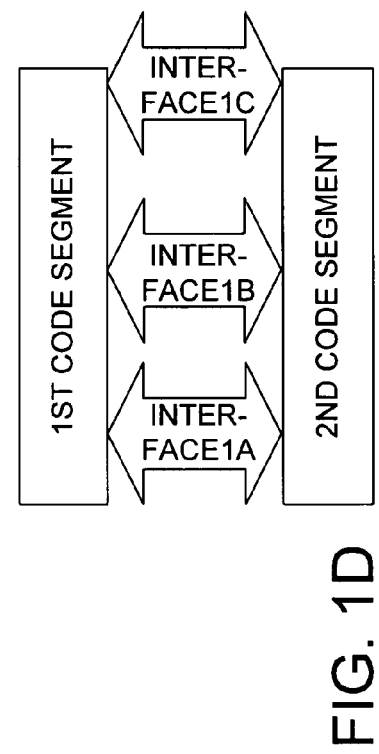
Figure 1E:
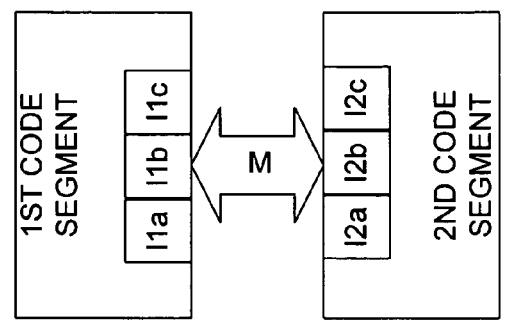

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 1C performs a function call square (input, output), which is received by interface I2, which after processing the value passed with input (to calculate the square of an input) by the second code segment, passes back the squared result with output. In such a case, the processing performed by the second code segment (squaring input) can be performed by the first code segment without a call to the interface.

D. Divorce

Figure 1K:
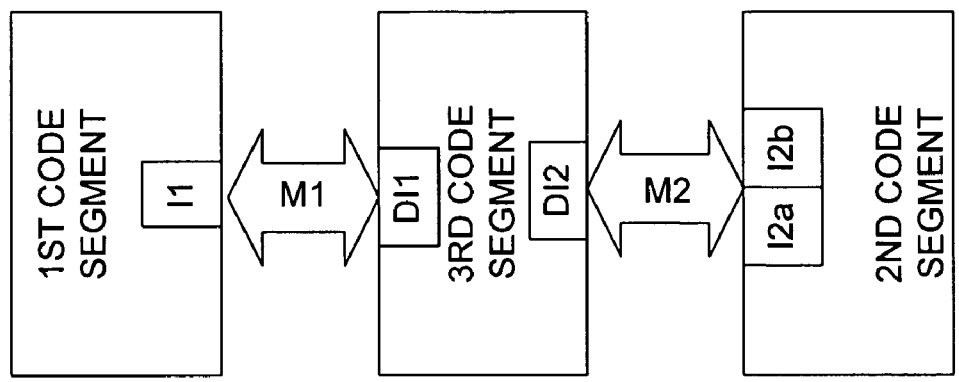
Figure 1J:
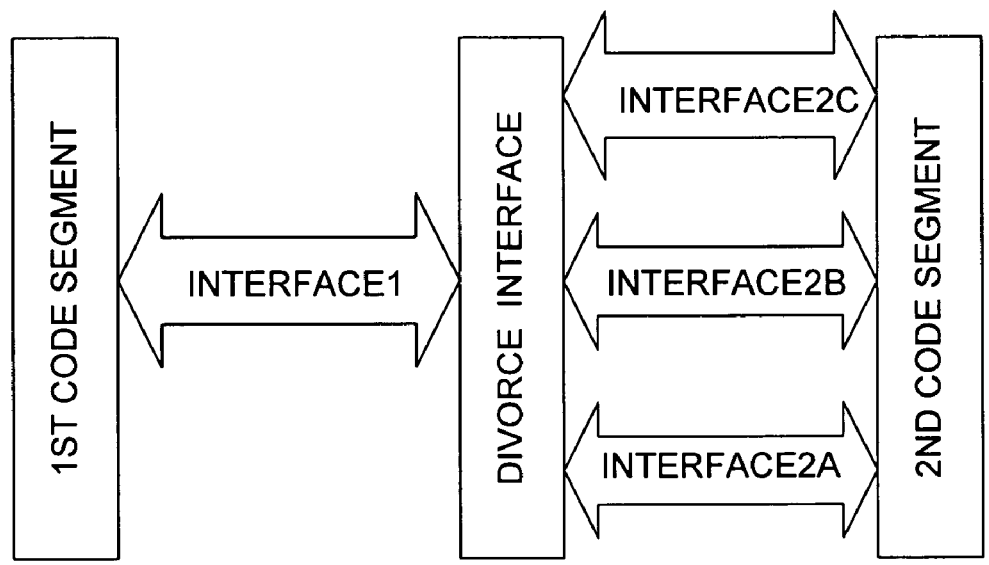

A communication from one code segment to another may be accomplished indirectly by breaking the communication into multiple discrete communications. This is depicted schematically in FIGS. 1J and 1K. As shown in FIG. 1J, one or more piece(s) of code (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2$a$ and I2$b$, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
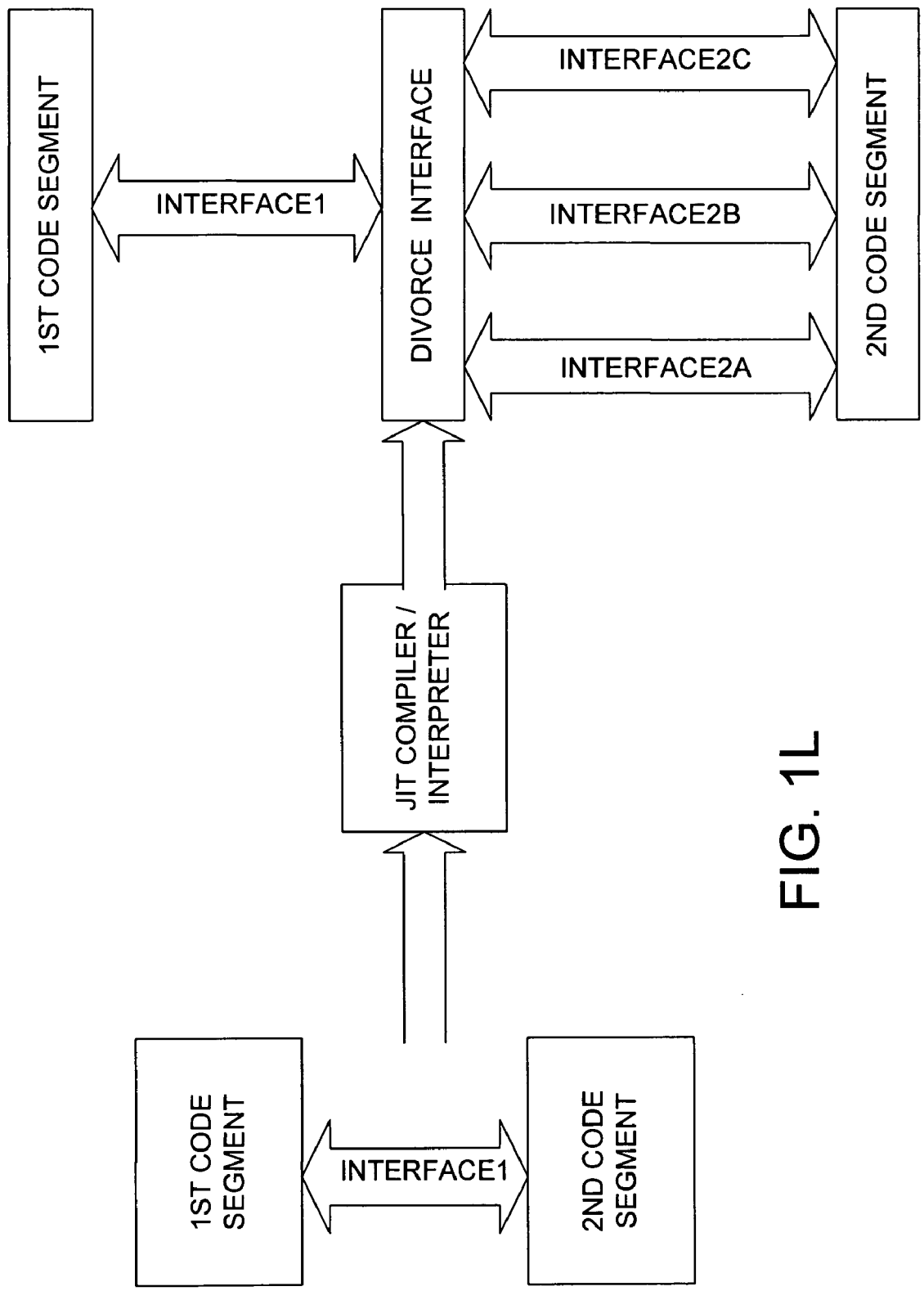
Figure 1M:
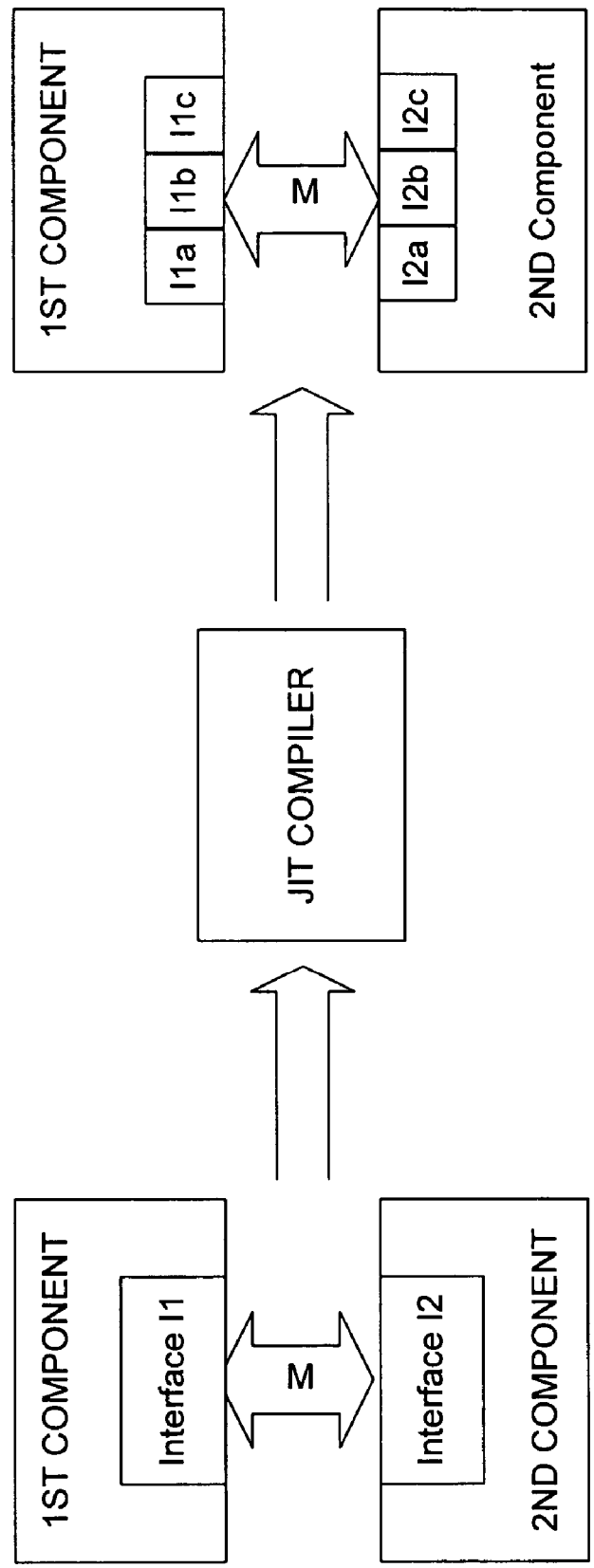

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2:
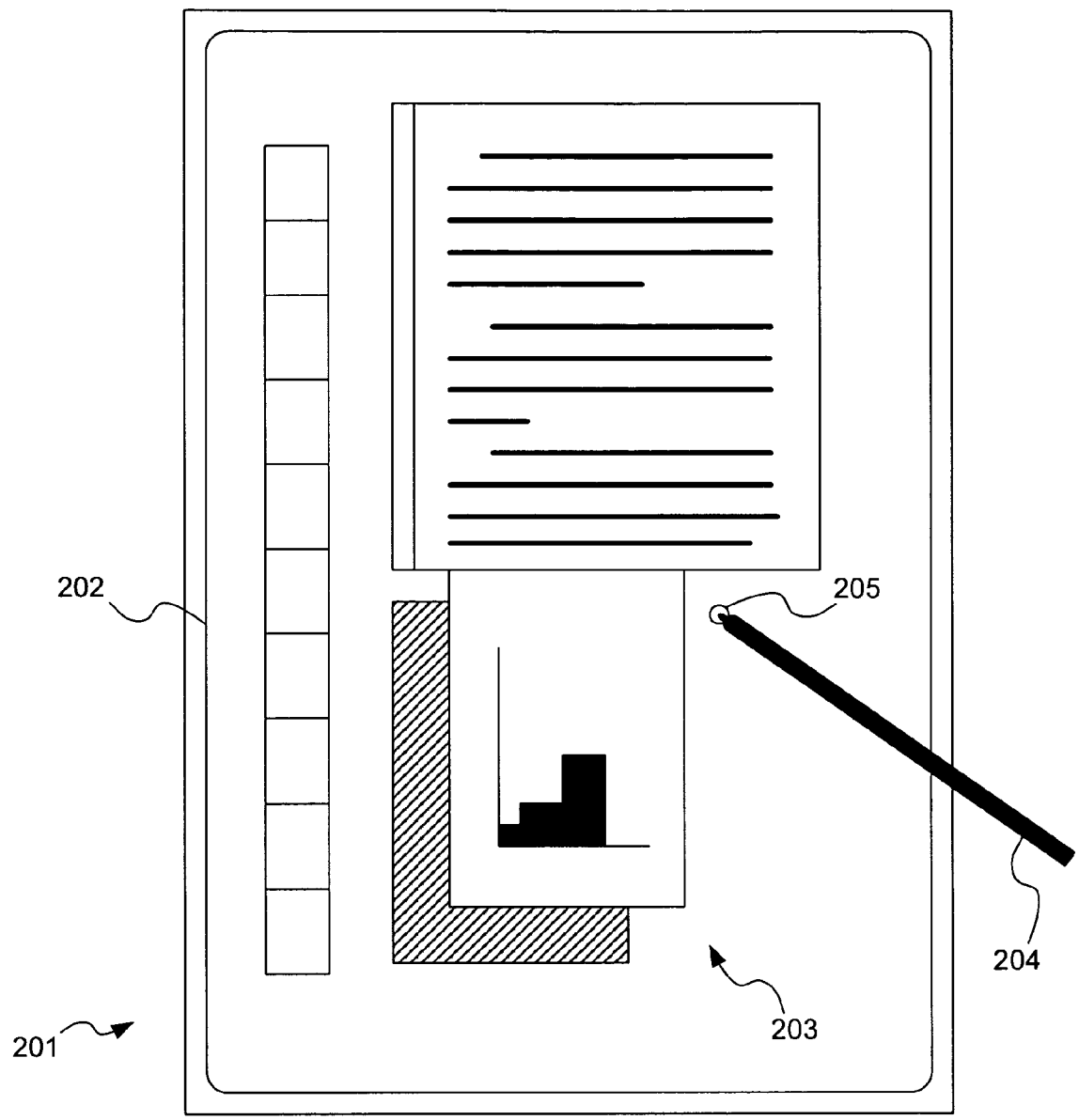
FIG. 2 shows an illustrative example of a tablet computer in accordance with aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the Net programming model from Microsoft Corporation.

Synchronous Document Model Updates

Figure 3:
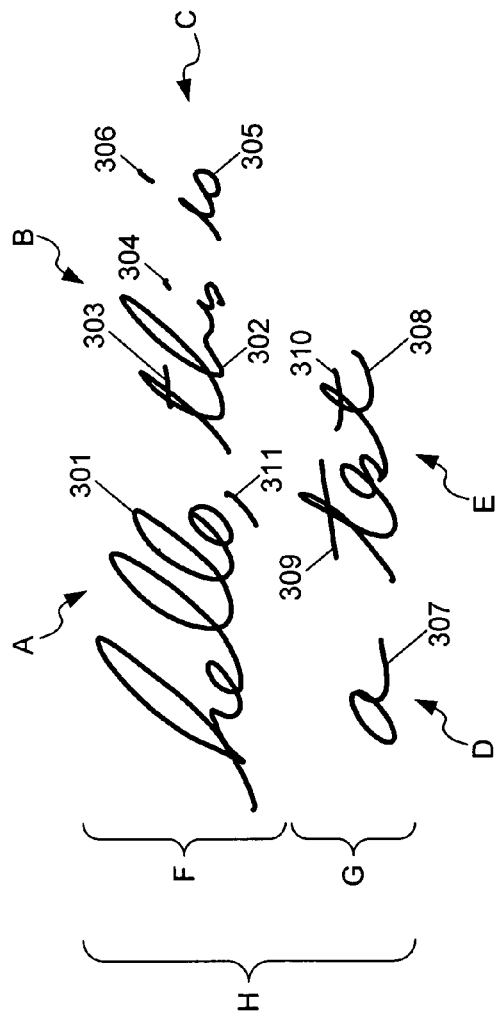
FIG. 3 shows an example of electronic ink in accordance with aspects of the present invention.
Figure 4:
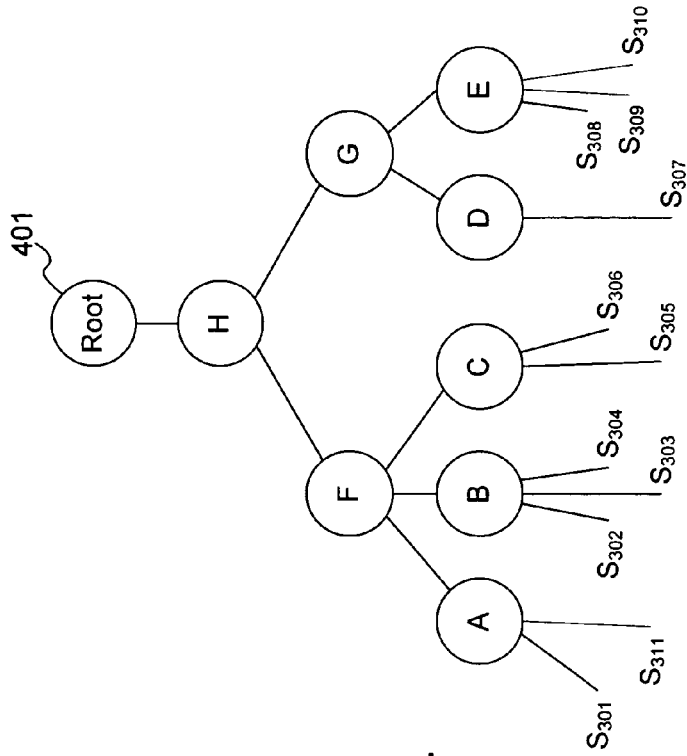
FIG. 4 shows an illustrative example of a context tree in accordance with aspects of the present invention.

FIG. 3 shows electronic ink that is analyzed and represented as a tree in FIG. 4. The electronic ink of FIG. 3 is the phrase "hello, this is a test", with the five words of the phrase represented by labels A-E. The word "hello," (A) includes two strokes 301 and 311. The word "this" (B) includes three strokes 302-304. The word "is" (C) includes two strokes 305-306. The word "a" (D) includes one-stroke 307. The word "test" (E) includes strokes 308-310. The phrase occupies two lines, "hello, this is" (F) and "a test" (G). These lines together form a paragraph (H).

FIG. 4 represents one possible interpretation of the electronic ink from FIG. 3. Root node 401 has a paragraph node H contained within it. Paragraph node H includes line nodes F and G. Line node F includes word nodes A-C. Line node G includes word nodes D and E. Each word node includes the strokes as described in FIG. 3. Each node A-H may be referred to as a context node. Each context node provides context for the other nodes for analysis, recognition, or other purposes. For instance, recognition of the strokes in node B may have one collection of results when the strokes are analyzed individually or with respect to all strokes of node B. However, the recognition results or ordering of the results may be different when an analysis of the strokes in node B includes an analysis (or previous analysis results) of the strokes from nodes A and C. Likewise, the recognition results may improve with the greater number of context nodes D-H that are included in the analysis of node B.

Because of this need for context in ink analysis, software applications using ink analysis tools may be required to supply a complete ink analysis document object model (ink DOM) each time ink is required to be analyzed. When a change is made to a "private" document within a software application using synchronous document model updates, the application must update the ink DOM. Likewise, when ink analysis tools make changes to the ink DOM (e.g., adding ink analysis results or revising analyzed results), the software application must be notified so that it may update its own private document model.

The term synchronous denotes that at any given moment, the ink DOM and a software application's private document should be synchronized. Updates are made whenever a change occurs to the ink DOM or the private document. This process of synchronous updates may slow the computer and frustrate the user.

On Demand Document Model Updates

An alternative to the frequent updates required of the synchronous option is the use of an on demand update architecture, which minimizes the frequency of updates between an ink document object model (ink DOM) and a software application's private document model. Using such a scheme, only high level context nodes may be created for a document. This means that a smaller number of incomplete context nodes may act as place holders for all of the text, ink, graphics, and so forth contained in the document. Ink strokes which need to be analyzed can be inserted as unclassified context nodes, and an ink analysis tool can then ask the software application to populate the high level context nodes with their child nodes, which for example represent lines and words of text. Frequent updates of the ink DOM become unnecessary using such a method. Instead, the ink DOM is minimally populated "on demand," allowing the software application to perform more efficiently.

On demand updates of an ink DOM may occur at any stage of an analysis of ink contained within the ink DOM. For example, requests that a software application fully populate particular context nodes may occur when the ink DOM is being read as part of the analysis process, or perhaps when the ink DOM is being updated with analysis results.

FIG. 5 depicts an illustrative rendering of a private document model in accordance with aspects of the present invention. Many software programs, for example a word processor, allow users to create, edit, view and print primarily text-based documents.

The latest versions of these software programs enable users to integrate ink words, drawings and annotations into their documents. FIG. 5 depicts a simple example of one such program, displaying a few lines of text and a few lines of ink. The sample program here is responsible for receiving input from the user, in the form of keystrokes and ink strokes, storing the input, and rendering an image of the input back to the user. Here, first text paragraph 511 displays a line of normal text, ink paragraph 512 displays a few lines of ink, and second text paragraph 513 displays another line of text.

Behind the scenes, the sample software application likely maintains the contents of the rendered document in some form of private document model. Such a model may be stored and manipulated in memory and/or saved to a non-volatile memory device like a disk drive or flash memory. The specific contents of the private document model are unimportant, so long as the model can be translated as needed into an ink DOM for ink analysis purposes. FIG. 6 depicts one possible text representation of a private document model. Here, the rendered document of FIG. 5 is described using a markup language similar to HTML or XML.

The private document model of FIG. 6 includes components for each of the paragraphs or ink objects in the document. Here, TEXT tag 611 contains information about the placement and content of first text paragraph 511. INKOBJ tag 612 contains location information as well as a serialized form of the ink objects underlying the handwriting in ink paragraph 512. Finally, TEXT tag 613 contains location and content information for second text paragraph 513. In rendering the document in FIG. 5, the sample software application may step through the components of the private document model in FIG. 6, rendering each based on the information stored in the model.

When an update is made to the document, for example the word "you" is deleted from the second text paragraph 513, the software application may delete the word from TEXT tag 613, and then re-render the document of FIG. 5, removing the text. If the software application is utilizing ink analysis under the synchronous paradigm, it will have to update its ink DOM. Under the on demand paradigm, an update won't be immediately necessary, although updating the ink DOM may be prudent to prevent stale results from being returned.

FIG. 7 represents a partially populated ink DOM 701 representing the document of FIGS. 5 and 6. The sample software application has assembled ink DOM 701 in anticipation of analyzing ink paragraph 512. Root context node A represents the base document, from which all subsequent nodes will be parented, either directly or indirectly. Node A's leftmost child is text paragraph context node B (context nodes need not necessarily be in the order shown here). Rather than populate context node B with the text line and text word context nodes (representing "My first document!"), the software application has left node B without any child nodes, and it has set partially populated flag 702 to true. Node B may require that at least a few properties be set, for example its context node type (e.g., text paragraph, image, etc.), an identifier, and a location for rendering. The location may include a measurement of pixels (or another unit of display) indicating the placement of node contents with a rendered document, and also may include a bounding measurement of a box or other shape which contains the node contents. Other forms of location information may be utilized.

Node A's second child is unclassified ink object context node C, with each of its many stroke objects associated underneath. Node C, being the recognition target of the ink analysis, is fully populated. Node A's third and final child is text paragraph context node D, also partially populated as with node B. Context node D represents a line of text ("Thank you!"), but the software application need not take the time to separate the words and populate the appropriate ink DOM objects. Node D also has its minimal properties set, including a partially populated flag set to true.

Once the ink DOM is ready in its partially populated state, the ink analysis tools are set to work analyzing unclassified node C, to see if the ink strokes are recognizable as text, image, annotation, or other. Using the location information provided with each of the partially populated nodes, the ink analysis tools determine which context nodes are close enough to provide context for the unclassified ink object and may be relevant to the recognition process. Providing context for unclassified ink objects may involve nearby text providing language context for ink words, nearby text or drawings being annotated or augmented by ink (e.g., ink used to underline text), and so forth. Having ink analysis tools select which nodes are needed as context for a particular analysis allows the tools to change their algorithms over time without requiring that a calling software application be updated.

Here, paragraph 511 (context node B), may be found to be close enough on the rendered document to be of interest to the analysis engine. In a situation where partially populated context node B is needed to perform ink analysis, the ink analysis tools will request that the software application fully populate the node with its child nodes. The ink analysis tools may make this request by raising an event, calling a callback function, providing a meaningful return value for a procedure call, or otherwise communicating the request to the software application.

Figure 8:
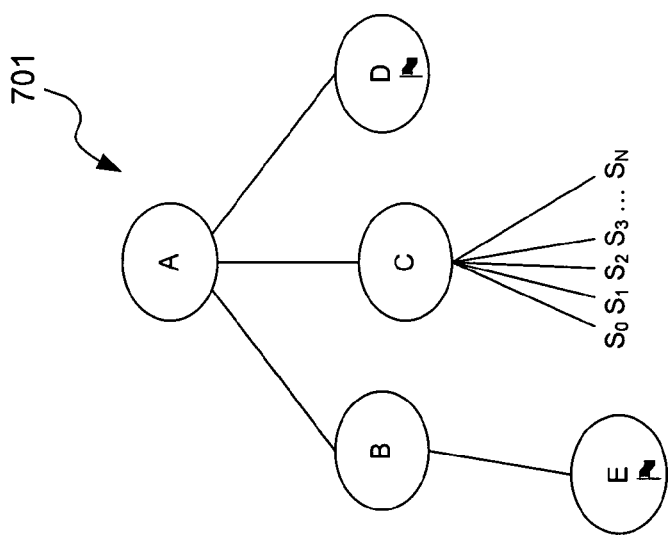

Upon receiving the request to fully populate context node B, the software application may analyze the contents of TEXT tag 611, determining that a single line of text is found in the paragraph. FIG. 8 represents the same partially populated ink DOM 701 representing the document of FIGS. 5 and 6, now with text line context node E, freshly added by the software application. The partially populated flag of context node B has now been set to false. Although the software application may choose to fully populate node E with its own children at this point, it need not necessarily do so. If, for example, paragraph 511 consisted of several lines of text (i.e. text line context node E would have several corresponding sibling nodes), the ink analysis tools may only request those lines of text within the paragraph closest to the unclassified ink object. In that example, populating all of the lines of text would be premature and unnecessary. Instead, the software application will likely minimally set the properties of E and set its partially populated flag to true.

Figure 9:
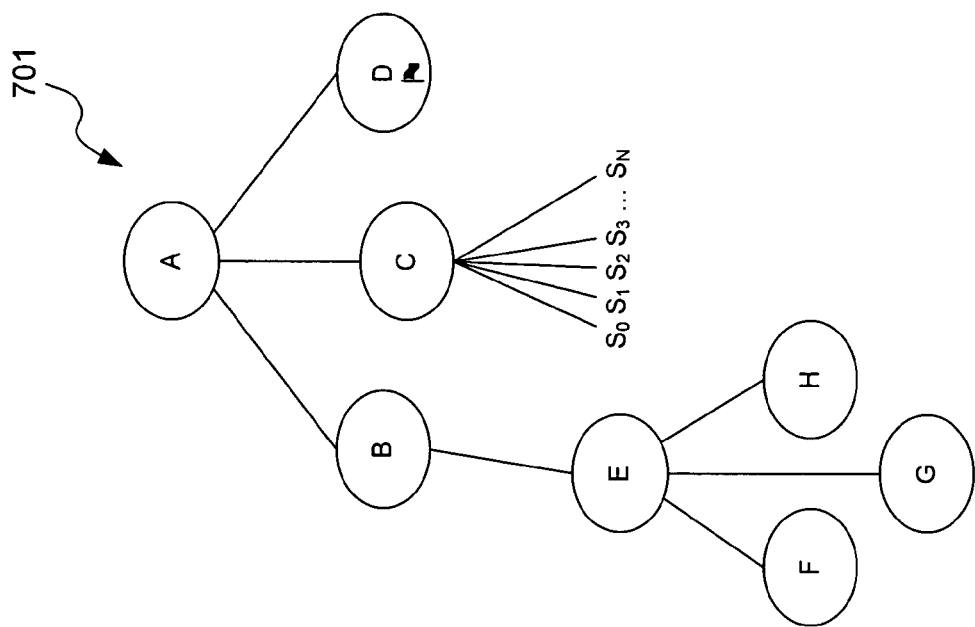

Once the software application has fully populated context node B, control returns to the ink analysis tools. Before proceeding, the ink analysis tools may verify that context node B has indeed been fully populated. If not, an exception may be thrown or an error may be returned to the software application. Otherwise, the ink analysis tools can continue examining ink DOM 701 to determine what context nodes might be needed to analyze the ink. Upon determining that the single line of text in paragraph 511 may be needed, the ink analysis tools again send a request to the software application to fully populate a partially populated context node, this time node E. Now, the software application must actually separate the words in the text line and populate the appropriate ink objects. FIG. 9 depicts ink DOM 701 after the software application has complied with the request to fully populate node E and returned control to the ink analysis tools. Each of the words in the line of text has been allocated its own context node (F, G, and H) by the software application. As these are leaf nodes (they have no child nodes), they may be fully populated with all of their properties. If all properties are not set on the leaf nodes, the partially populated flag should be set to true, and the ink analysis tools will repeat the process with any leaf nodes that are needed for analysis. Once the ink analysis tools have coerced all the nodes needed to perform an ink analysis operation, the analysis will begin, likely processed in the background on computer 110.

Figure 10:
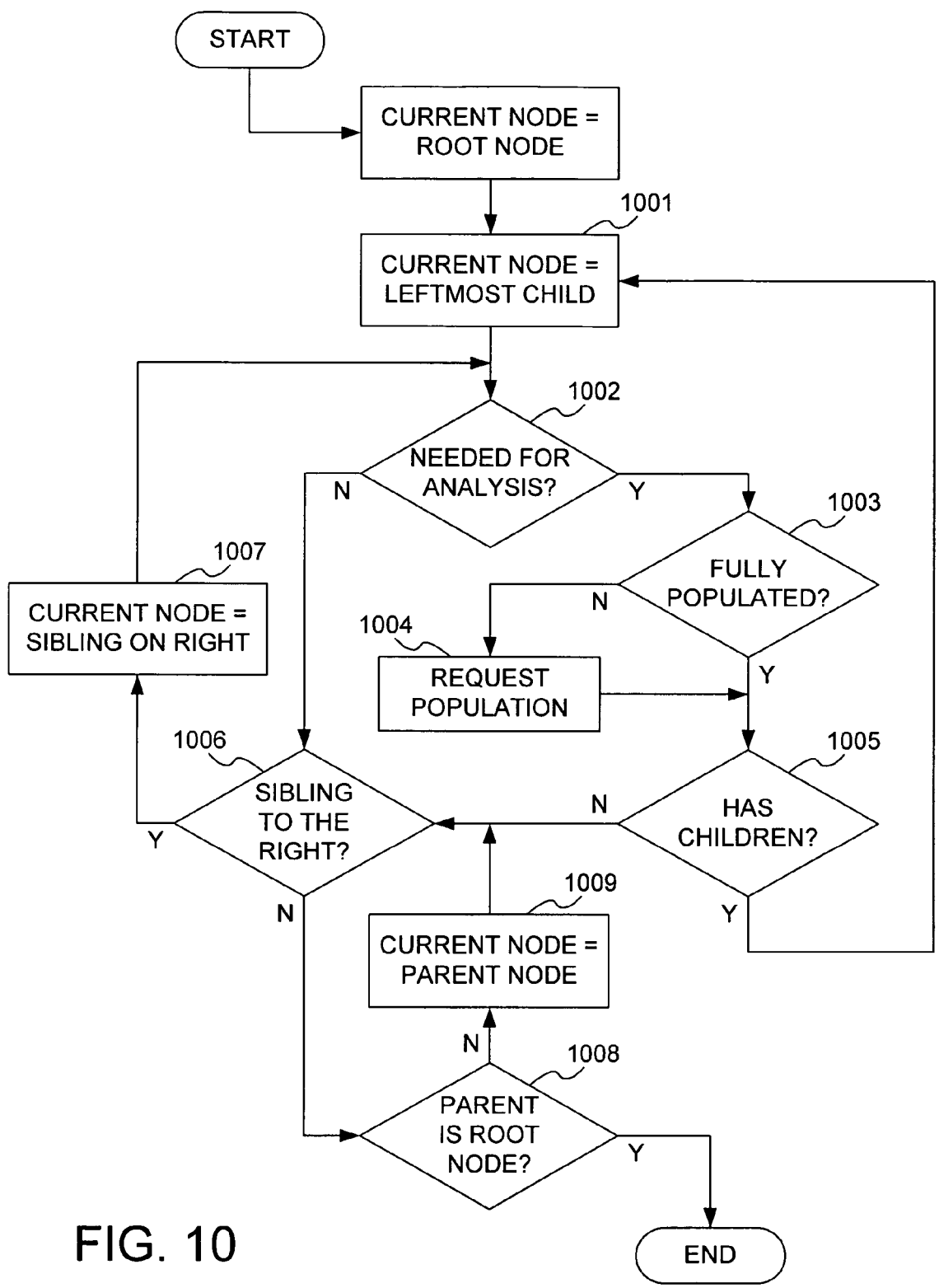
FIG. 10 shows a process for traversing an incomplete context tree in accordance with aspects of the present invention.

FIG. 10 shows a process for traversing an incomplete context tree in accordance with aspects of the present invention. The algorithm displayed gives one embodiment for a method of traversing a document model to find nodes needed to perform an ink analysis operation, and to ensure that the needed nodes are fully populated. At step 1001, the leftmost child node of the root context node is examined. At decision 1002, the child node is examined to see if it is needed for analysis. If it is not, then at decision 1006, if there is a sibling node to the right, the sibling is made the current node at step 1007 and it is checked to see if is needed for analysis at decision 1002, as before.

If a node is needed for analysis, then at decision 1003, the node is checked to see if it is fully populated with properties and children. If not, at step 1004, a request is made to fully populate the context node, by raising an event, calling a call back function, or making some other form of request. Once populated, at decision 1005, the current node is checked to see if it has any children. If so, the first child is made the current node at step 1001 and the process repeats. If the current node has no children, then at step 1006, the current node is checked for siblings. If there is a sibling to the right, then the process repeats with the sibling. If no more siblings are to the right of the current node, then at decision 1008, the parent of the current node is checked. If the current node's parent is not the root node, then at step 1009, the parent is made the current node, and the process continues by checking for siblings to the right at decision 1006. If back at decision 1008, the current node's parent is the root node, and it necessarily had no more siblings, then the traversal is complete.

Other methods for ensuring a properly populated context tree may be known to those of skill in the art, and may require additional steps, such as traversing the tree a second time once all unclassified ink nodes are located after the first traversal.

Once an ink analysis operation begins, it may provide results in one or more steps. For example, results may be provided in two steps, (1) a less certain intermediate result, and (2) a more certain final result. Regardless of whether the results come in one or multiple phases, the process of updating the ink DOM with results may be roughly the same.

When a set of results is ready, the ink analysis tools may notify the software application that the ink DOM is about to be modified, perhaps by raising an event. If any changes have been made to the software application's document since the analysis operation began, it can use this notification as a chance to repopulate the root node with partially populated context nodes. This may also be a time for the software application to engage a write lock on its own document model in order to ensure that changes occurring to the private document model do not collide with the changes happening in the ink DOM. Once again, the ink analysis tools may have to make requests to filly populate certain nodes. But interspersed throughout these populate requests would be write notifications or events when context nodes are added, modified, moved, or deleted as the ink analysis tool integrates the results into the ink DOM. These write notifications allow the software application to make the same changes to its own private document model. Once the results are fully integrated into the ink DOM, the ink analysis tools may notify the software application that its changes are done, in which case the software application can remove any write lock that may have been set and start to work with the results provided.

Below is a list of sample event names and their descriptions. These events may be raised by an ink analysis tool while analyzing ink, in order to allow the calling software application to update the ink document model, and its own document model.

TABLE 2

Ink Analysis Events

| Event Name | Description |
|---|---|
| ContextNodeCreated | Raised after a child context node is created. Returns the context node created. |
| ContextNodeDeleting | Raised before a context node is deleted. Returns the context node about to be deleted. |
| ContextNodeLinkAdding | Raised before a link is added to a context node. Returns the context link being added. Link allows access to both the source and destination context nodes. |
| ContextNodeLinkDeleting | Raised before a link to a context node is removed. Returns the context link being deleted. |
| ContextNodeMovingToPosition | Raised before a child node is reordered with respect to its siblings. Returns the parent context node whose children are being reordered. Also returns the old index position of the child being reordered and the new index position. |
| ContextNodePropertiesUpdated | Raised after any properties of a context node are changed. The change may occur directly or as a result of changing a parent's property. Returns the context node that had a property change. |

TABLE 2-continued

Ink Analysis Events

| Event Name | Description |
| --- | --- |
| ContextNodeReparenting | Raised before a context node is re-parented. Returns the new parent context node as well as the child context node that is being re-parented. |
| StrokeMoved | Raised before a Stroke object is re-parented. Returns the source and destination context nodes for the moving stroke collection. Also returns the collection of strokes being moved. |
| InkAnalyzerStateChanging | Raised to allow the application to clear the state of the ink document model. During the reporting of ink analysis results, various other events may be raised, providing the application the opportunity to re-populate the ink document model. |
| PopulateContextNode | Raised before a specified context node is going to be accessed. Returns the context node that needs to be populated. Applications need to fully populate this node and its parent. All children need to be "partially populated". If any descendant information is needed a separate event will be raised for that descendant. |

CONCLUSION

The present invention has been described in terms of preferred and exemplary embodiments thereof. Numerous other embodiments, modifications, and variations within the scope and spirit of the appended claims will occur to persons of ordinary skill in the art from a review of this disclosure. The software components and methods described above may be utilized in contexts other than in analysis of electronic ink. For example, any computer-executable code utilizing a traversable data structure may implement the "on demand" architecture of selectively populating the data structure on an as-needed basis.

We claim:

1. A processor-implemented method for interacting with a data structure, the method comprising the steps of:
    (a) generating, via the processor, the data structure comprising nodes that represent electronic ink, wherein electronic ink comprises an electronic representation of ink strokes and wherein the data structure is left incomplete by only partially populating a node therein;
    (b) traversing a set of nodes within the data structure;
    (c) selecting a node from among the set of nodes;
    (d) determining that the selected node is partially populated; and
    (e) requesting that the partially populated node be fully populated, thereby fully populating the partially populated node on demand.

2. The method of claim 1, further comprising:
    (f) repeating steps (c)-(e) for a set of remaining nodes of the original set of nodes.

3. The method of claim 1, further comprising:
    (f) repeating steps (b)-(e) for a set of child nodes added as a result of the request to fully populate.

4. The method of claim 1, further comprising:
    (f) verifying that the previously partially populated node was fully populated.

5. The method of claim 1, further comprising:
    (f) initiating an ink analysis process using the traversed data structure.

6. The method of claim 5, further comprising:
    (g) updating the data structure with results from the ink analysis process.

7. The method of claim 1, wherein the partially populated node comprises a context node type, an identifier, a location, and a partially populated flag.

8. The method of claim 1, wherein step (e) comprises raising one or more events.

9. The method of claim 1, wherein the data structure comprises a tree structure.

10. The method of claim 1, wherein selecting a node from among the set of nodes needed for analyzing ink comprises selecting the node based on a location property of the node.

11. A processor-implemented method for interacting with an ink analysis tool, the method comprising steps of:
    assembling a context node data structure to model a document, wherein the document comprises electronic ink, wherein electronic ink comprises an electronic representation of ink strokes and wherein the context node data structure is left incomplete by only partially populating a context node therein;
    initiating an ink analysis on the context node data structure;
    receiving a request from the ink analysis tool to fully populate the partially populated context node; and
    populating, via the processor, the partially populated context node in response to the request, thereby fully populating the partially populated context node on demand.

12. The method of claim 11, wherein the partially populated node comprises a context node type, an identifier, a location, and a partially populated flag.

13. The method of claim 11, further comprising:
    receiving a notification from the ink analysis tool when ink analysis results have been integrated into the context node data structure.

14. The method of claim 11, wherein the data structure comprises a tree structure.

15. A system for interacting with a data structure, the data structure comprising a representation of electronic ink, wherein electronic ink comprises an electronic representation of ink strokes and wherein the data structure is left incomplete by only partially populating a node therein, the system comprising:

a storage that stores the data structure;

a processor that accesses the data structure in the storage, the processor configured to perform the steps of:

(a) traversing a set of nodes within the data structure;

(b) selecting a node from among the set of nodes needed for analyzing ink;

(c) determining that the selected node is partially populated; and (d) requesting that the partially populated node be fully populated, thereby fully populating the partially populated node on demand.

16. The system of claim 15, wherein the storage comprises one of a memory, a hard drive, and a computer-readable medium.

17. The system of claim 15, wherein the processor is further configured to perform the step of:

(e) initiating an ink analysis process using the traversed data structure.

18. The system of claim 17, wherein the processor is further configured to perform the step of:

(f) updating the data structure with results from the ink analysis process.

19. The system of claim 18, wherein the processor is further configured to perform the step of:

(g) sending a notification that the data structure is being updated with results from the ink analysis process.

20. The system of claim 15, wherein the data structure comprises a tree structure.

21. A tangible computer readable storage medium having computer-executable instructions for performing a method for interacting with a data structure, the method comprising the steps of:

(a) generating, via the processor, the data structure comprising nodes that represent electronic ink, wherein electronic ink comprises an electronic representation of ink strokes and wherein the data structure is left incomplete by only partially populating a node therein;

(b) traversing a set of nodes within the data structure;

(c) selecting a node from among the set of nodes;

(d) determining that the selected node is partially populated; and (e) requesting that the partially populated node be fully populated, thereby fully populating the partially populated node on demand.

22. The tangible computer readable storage medium of claim 21, wherein the method further comprising:

(f) repeating steps (c)-(e) for a set of remaining nodes of the original set of nodes.

23. The tangible computer readable storage medium of claim 21, wherein the method further comprising:

(f) repeating steps (b)-(e) for a set of child nodes added as a result of the request to fully populate.

24. The tangible computer readable storage medium of claim 21, wherein the method further comprising:

(f) verifying that the previously partially populated node was fully populated.

25. The tangible computer readable storage medium of claim 21, wherein the method further comprising:

(f) initiating an ink analysis process using the traversed data structure.

26. The tangible computer readable storage medium of claim 25, wherein the method further comprising:

(g) updating the data structure with results from the ink analysis process.

27. The tangible computer readable storage medium of claim 21, wherein the partially populated node comprises a context node type, an identifier, a location, and a partially populated flag.

28. The tangible computer readable storage medium of claim 21, wherein step (e) comprises raising one or more events.

29. The tangible computer readable storage medium of claim 21, wherein the data structure comprises a tree structure.

30. The tangible computer readable storage medium of claim 21, wherein selecting a node from among the set of nodes needed for analyzing ink comprises selecting the node based on a location property of the node.

31. A tangible computer readable storage medium having computer-executable instructions for interacting with an ink analysis tool, the method comprising the steps of:

assembling a context node data structure to model a document, wherein the document comprises electronic ink, wherein electronic ink comprises an electronic representation of ink strokes and wherein the context node data structure is left incomplete by only partially populating a context node therein;

initiating an ink analysis on the context node data structure;

receiving a request from the ink analysis tool to fully populate the partially populated context node; and populating, via the processor, the partially populated context node in response to the request, thereby fully populating the partially populated context node on demand.

32. The tangible computer readable storage medium of claim 31, wherein the partially populated node comprises a context node type, an identifier, a location, and a partially populated flag.

33. The tangible computer readable storage medium of claim 31, wherein the method further comprising:

receiving a notification from the ink analysis tool when ink analysis results have been integrated into the context node data structure.

34. The tangible computer readable storage medium of claim 31, wherein the data structure comprises a tree structure.

* * * * *